United States Patent [19]

Barth et al.

[11] Patent Number: 4,509,245

[45] Date of Patent: Apr. 9, 1985

[54] APPARATUS FOR SECURING PARTS ON ELONGATED WRITING INSTRUMENTS, IN PARTICULAR FOR SECURING AN ERASER FOR A SHEATH RECEIVING IT ON A PENCIL

[75] Inventors: Walter Barth, Nuremberg; Harald H. Kremser, Postbauer-Heng, both of Fed. Rep. of Germany

[73] Assignee: Bleistiftmaschinenfabrik Dipl. Ing. Karl Zuber GmbH & Co. KG, Nuremberg, Fed. Rep. of Germany

[21] Appl. No.: 484,866

[22] Filed: Apr. 14, 1983

[30] Foreign Application Priority Data

Apr. 22, 1982 [DE] Fed. Rep. of Germany ....... 3214994

[51] Int. Cl.[3] ............................................ B23P 19/02

[52] U.S. Cl. .................................................... 29/525

[58] Field of Search ................. 29/429, 464, 466, 508, 29/509, 510, 511, 515, 516, 520, 525, 783, 787, 791, 793-796

[56] References Cited

U.S. PATENT DOCUMENTS 3,534,419 10/1970 Deans et al. .......................... 29/520
3,577,850 5/1971 Harris .................................. 29/520
3,837,065 9/1974 Abbe et al. ............................ 29/783
3,921,281 11/1975 Hattori et al. ........................ 29/520
4,345,963 8/1982 Braber .................................. 29/787
4,383,359 5/1983 Suzuki et al. ......................... 29/783

*Primary Examiner*—Howard N. Goldberg
*Assistant Examiner*—Steven E. Nichols
*Attorney, Agent, or Firm*—Browdy and Neimark

[57] ABSTRACT

In a method intended particularly for securing an eraser and/or a sheath receiving it on a pencil in one continuous operation, it is provided that the pencils are conveyed through a work station and during that time, several sheaths or erasers and associated tools are simultaneously moved along with the pencils at the same speed as the pencils during a first work phase and are attached to the pencils during this time via the tools; in a second work phase, after the attachment process is completed, the tools are returned rapidly to the outset point, counter to the conveyance direction. The invention is furthermore directed to an apparatus for performing this method, which assures a very high operating speed. This apparatus includes at least one feeder device connected with a supply magazine for supplying one eraser or sheath to each of n feeder recesses having closed rear sides and being disposed beside one another in the feeder device. The feeder device is coupled via a cam drive with the drive mechanism of the transporting device in such a manner that the method step provided in accordance with the intention can in fact be performed.

19 Claims, 7 Drawing Figures

APPARATUS FOR SECURING PARTS ON ELONGATED WRITING INSTRUMENTS, IN PARTICULAR FOR SECURING AN ERASER FOR A SHEATH RECEIVING IT ON A PENCIL

FIELD OF THE INVENTION

The invention relates to a method for attaching parts to elongated writing instruments, in particular for securing an eraser and/or a sheath receiving the eraser on a pencil, wherein the pencils are guided parallel to and equidistant from one another through a work station in which processing or attaching tools move along in alignment with the pencils, and to an apparatus for performing this method.

BACKGROUND OF THE INVENTION

Securing cylindrical erasers to one end of a pencil using a metal sheath has been known for many years. The usual method involves pushing the sheath onto the pencil from its conically tapered end and then, after the insertion of the eraser into the sheath, radially deforming the sheath, with these operations taking place sequentially.

In the apparatus described by German laid-open application DE-OS No. 23 56 071, the individual production steps were successfully united into a continuous operation. However, the transport drums for the pencils provided in that apparatus necessitate a relatively expensive holder for the drums, and the distance between the individual pencils has to be relatively great, because one individual processing tool is assigned to each individual pencil. The processing speed thereby attainable is accordingly not yet satisfactory.

SUMMARY OF THE INVENTION

It is accordingly the principal object of the invention to provide a method, and apparatus for performing the method, of the general type described above which is highly reliable in operation, and which facilitates a high operating speed.

This object is attainable by including the steps of attaching a sheath or inserting an eraser, which themselves are discontinuous in nature, into a continuous operation by providing that a feeder device moves along with the pencils being conveyed by a transporting device while the operation is being performed, and that the sheaths be attached simultaneously to a plurality of pencils. The time elapsing during the rapid return travel of the feeder device does not have the effect of an interruption of the operation, because new sheaths or erasers are delivered during the entire time.

Another object of the present invention is that the method be performed such that two, three or four pencils are processed at a time, thus producing a particularly favorable ratio between the mass of the parts of the feeder device which are being moved and the travel speed of the pencils being advanced within the work station.

Still another object of the invention is to incorporate the process of tapering, which is a preparatory step for the actual process of attachment, into the continuous operation as well.

Yet another object is to provide a cam drive for coordinating movement of the feeder device with the drive of the transporting device.

Other objects of the invention include:

(1) providing a tapering device movable in a coordinated manner with the drive of the transporting device, so that the pencils are provided with a slightly conical shape on one end whereby a self-centering effect is attained during the subsequent attachment of the sheaths, and firm clamping of the sheath occurs under the influence of an applied axial pressure;

(2) providing that the tapering device have a conical shaping recess to counteract any seizing that might otherwise occur as the tapering tool is retracted after the tapering has been effected;

(3) providing means for preventing the pencils from sticking to the tapering device;

(4) providing only a single conveyance route so that the entire assembly process can take place without any preliminary assembly or intervention from outside;

(5) providing a gluing station so that a supplemental hold on the sheaths is attained;

(6) providing a stop device for the transporting device so that the pencils being moved forward are fixed in the axial direction;

(7) providing that the pencils be prevented from tilting out of alignment due to friction with the stop device as pressure is applied while the pencils simultaneously continue to be transported;

(8) providing that, when the sheaths and the erasers are attached, the pencils be delivered in a precisely defined position;

(9) providing that the pressing mechanism of the feeder device includes recesses having cylindrical shape which facilitate the alignment of the sheaths or erasers with the pencils;

(10) providing that the base body of the feeder device be driven, reciprocably, in a direction normal to the conveyance direction thereby attaining coordination of movement between the transporting movement and the reciprocating movement of the base of the feeder device;

(11) providing one position of the feeder device in which the outlet openings of the feeder lines are blocked;

(12) providing means for refilling the feeder receses when the feeder device is making its return trip, so that a substantial increase in the operating speed can be attained, and

(13) providing a reliable guidance system for the movement of the feeder device.

BRIEF DESCRIPTION OF THE DRAWINGS

Further characteristics, advantages and details of the invention will become apparent from the following description of a preferred form of embodiment, when taken in conjunction with the drawings, in which.

DESCRIPTION OF THE PREFERRED EMBODIMENT

The apparatus according to the invention and its mode of operation will now be described in terms of the attachment of sheaths and erasers onto pencils. The invention however, is not restricted to pencils, and can instead be applied in like manner to similar writing instruments, and parts which are to be attached thereto.

Figure 1:
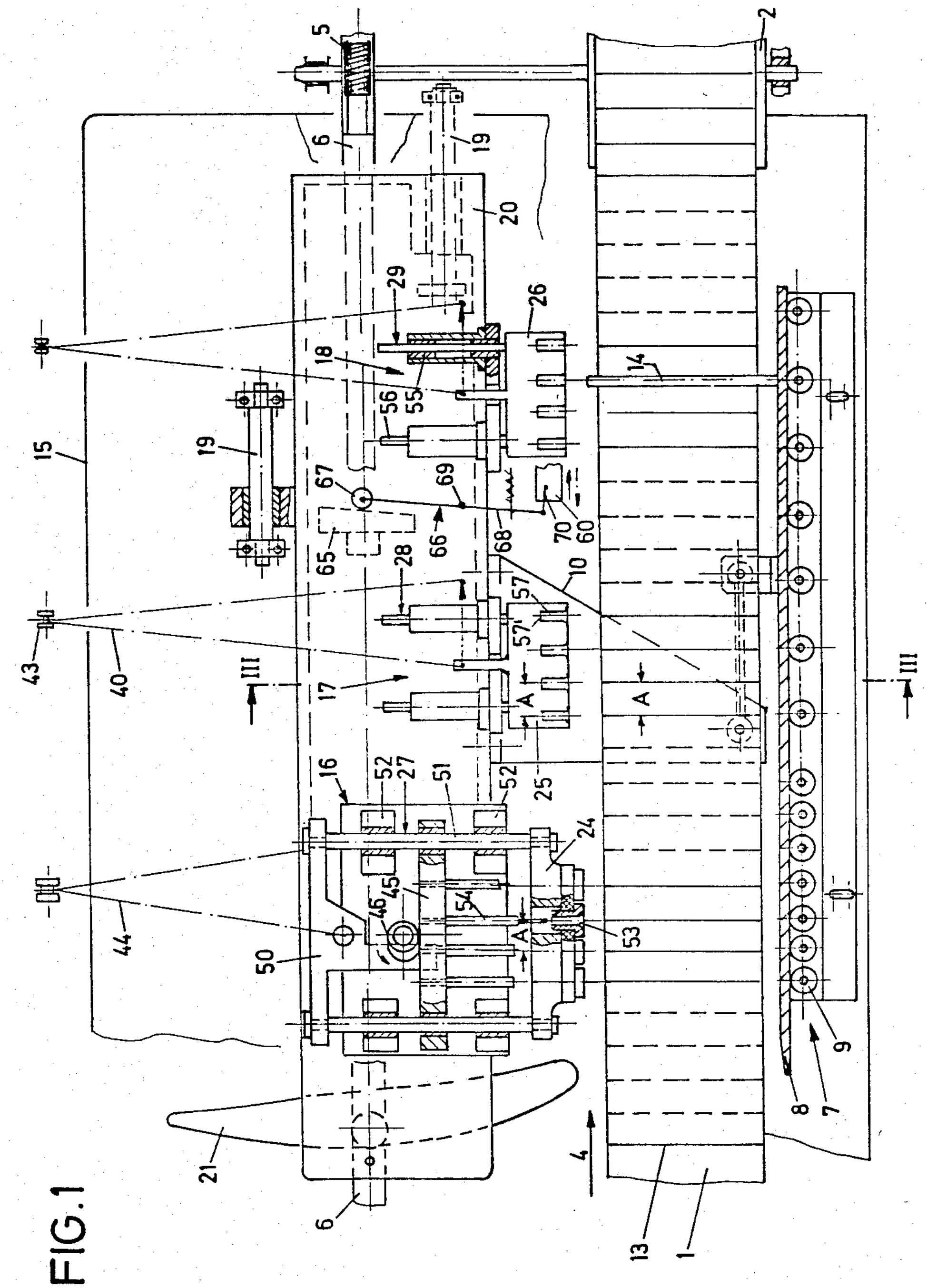
FIG. 1 is a schematic top view of an apparatus according to the invention.

In FIG. 1, a conveyor belt 1 is shown which travels around deflection rollers 2, 3. The direction of conveyance in the work station is indicated by the arrow 4. The conveyor belt 1 is driven via a worm 5 located on a main drive shaft 6, the latter being driven by a motor (not shown). In an exemplary embodiment, rotational drive of the sprocket 2 may occur at the end of the conveyance route if the conveyor belt 1 is embodied as a high-grade steel band. However, it can be effected at the deflecting roller 3, also embodied as a sprocket, and as such may be advantageous if the conveyor belt 1 is embodied as a pushed (instead of pulled) chain, so as to avoid having spaces between the individual links of the chain conveyor 1.

On one side of the conveyor belt 1 (at the bottom in FIG. 1), a stop device or assembly 7 is provided. It includes a strip 8, which is movable back and forth in a plane at right angles to the plane in which the conveyor belt 1 moves, in synchronism with a work plate 20 to be described later. A guide means for the strip 8 is provided by rollers 9. the drive connection 10 is shown only schematically.

Figure 2:
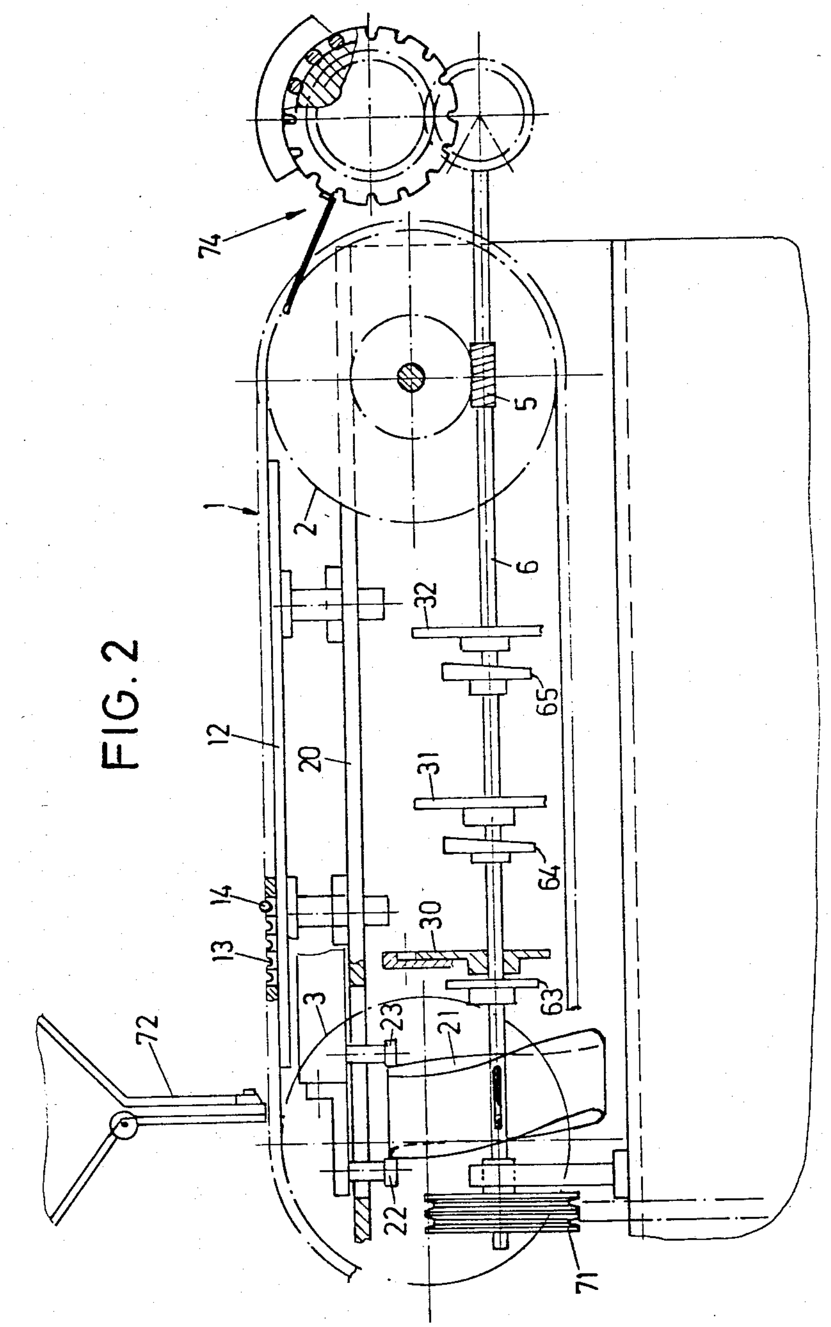
FIG. 2 is a schematic longitudinal section taken through an apparatus according to the invention.

As may be seen in FIG. 2, a guide plate 12 is provided beneath the upper segment of the conveyor belt 1. Recesses 13 are provided at regular intervals on the conveyor belt 1, disposed parallel to one another and at right angles to the conveyance direction 4 of conveyor belt 1; each recess 13 is capable of receiving one pencil 14.

The frame 15 which supports the apparatus according to the present invention is provided on the side opposite the stop assembly 7. A tapering device 16, a feeder device 17 for the sheaths and a feeder device 18 for the erasers are provided sequentially, one next to the other on the frame 15. The three devices are located on a common work plate 20 which is movable back and forth in the conveyance direction 4 via a sled guide 19. A gluing station may also be disposed between the feeder devices 17 and 18.

The movement of the work plate 20 is controlled via a control cam cylinder 21 seated on the main drive shaft 6. The movement of opposing sides of control cam cylinder 21 is scanned or followed by (i.e. transmitted to) the rollers 22, 23, which are secured on the work plate 20, and the control cam cylinder 21 is shaped such that (1) the work plate 20 moves parallel to the conveyor belt 1 in the conveyance direction 4 during a first movement phase, with the major portion of this movement taking place at the speed of the conveyor belt 1, and (2) the work plate 20 executes a backward movement counter to the conveyance direction during a second movement phase. The speed of the backward movement is substantially greater than the conveyance speed; this second phase is accordingly substantially shorter in duration than the first phase.

The tapering device 16 and the feeder devices 17, 18 each have respective base bodies 24, 25 and 26, which are in turn movable back and forth at right angles to the conveyance direction 4, relative to the work plate 20 and to the conveyor belt 1, via respective sled guides 27, 28 and 29. The drive of the reciprocating movement of the base bodies 24, 25, 26 is derived from the main drive shaft 6 via respective cam drives 30, 31, 32. Cam cylinders which are scanned on both sides are preferably used as the cam drives 30–32, because good compulsory guidance is thereby attained. In the exemplary embodiment, cam discs are shown as the cam drives.

Figure 3:
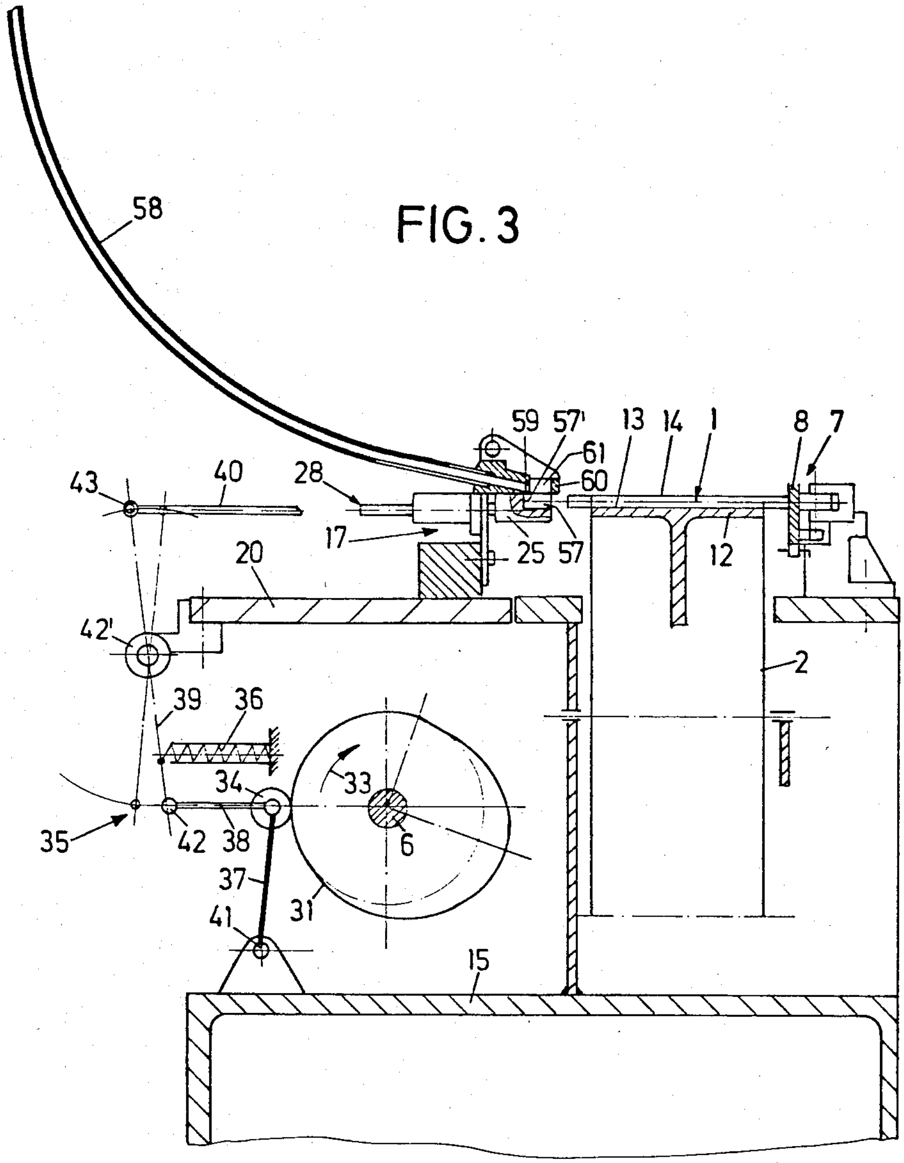
FIG. 3 is a cross section taken along the line III—III of FIG. 1.

In FIG. 3, the cam drive 31 for the base body 25 of the feeder device for the sheaths is shown, with the cam drives 30 and 32 being practically identical in design. The control disc of the cam drive 31 is seated on the main drive shaft 6 and turns in the direction of the arrow 33. The movement of the cam disc of the cam drive 31 is scanned or followed by a roller 34, which is seated on the transmission linkage 35 and is pressed by the force of the spring 36 against the cam disc. The transmission linkage 35 substantially comprises four linkage elements 37–40, with the linkage elements 37 and 39 being approximately vertical and the linkage elements 38 and 40 being approximately horizontal. The linkage element 37 is supported with its lower end on the stationary joint 41 on the frame 15. At its upper end, linkage element 37 carries the roller 34. From there, the linkage element 38 leads to the free deflecting joint 42, which interconnects the linkage elements 38 and 39. The linkage element 39 is pivotably disposed approximately at its center via the vearing 42' connected in a stationary manner via work plate 20 with the base body 25. At the end of the linkage element 39, a joint 43 is provided which is interconnected with the approximately horizontal linkage element 40. Joint 43 permits movement about both an axis parallel to the conveyance direction 4 and an axis at right angles to the plane of the work plate 20. The linkage element 40 is connected with the base body 25 via a joint (not shown in detail), which permits a movement about a plane at right angles to the work plate 20.

The drive of the tapering device 16 is similar in design to that of the feeder devices 17, 18. However, the linkage element 44 corresponding to the linkage element 40 terminates at a force-transmitting frame 50. The force-transmitting frame 50 has two longitudinal struts 51 disposed parallel to and spaced apart from one another, which are guided on the work plate 20 at 52 and which carry the base body 24 of the tapering device 16 on their ends remote from the linkage 44. Trumpet-shaped recesses 53 for tapering the pencils 14 are disposed on the base body 24, spaced apart by a distance A, as may be seen from the partially cutaway view of FIG. 1. Each such recess 53 is aligned with a corresponding stripping-off device 54 shown only schematically. These stripping-off devices are placed such that upon the return travel of the base body following the tapering process, any pencils 14 which may stick to it are held in their places. This result is attained by providing that the stripping-off devices 54 be secured on a common cross-strip 45 engaged by a cam disc 46 driven via a gear rack (not shown in detail). In this way, the stripping-off devices 54 are deflected relative to the longitudinal struts 51 such that during the return travel of the tapering device 16 they rest against the end faces of the pencils 14.

The feeder devices 17 and 18 are substantially identical in design, so that their design will be described here substantially in terms of the feeder device 17 for the sheaths. As already described, the feeder device 17, 18 have respective base bodies 25 and 26, which are disposed on respective sled guides 28 and 29. The embodiment of these sled guides 28, 29 is apparent in FIG. 1 from the partially cutaway guide 29, which includes guide sleeves 55 and guide rods 56. Feeder recesses 57 in the form of cylindrical segments are disposed in the base body 25, and their radius of curvature is approximately equal to that of the sheaths which are to be received there, so that these sheaths are held in a definite position. The recesses 57 are open toward the top and are closed at the back by the rear wall 57′. In the exemplary embodiment, the number n of feeder recesses 57 is four. The spacing between the feeder recesses 57, which are parallel to one another and disposed equidistant from one another, equals the distance A between the recesses 13 for the pencils 14 on the conveyor belt 1.

Figures 4, 5, 6:
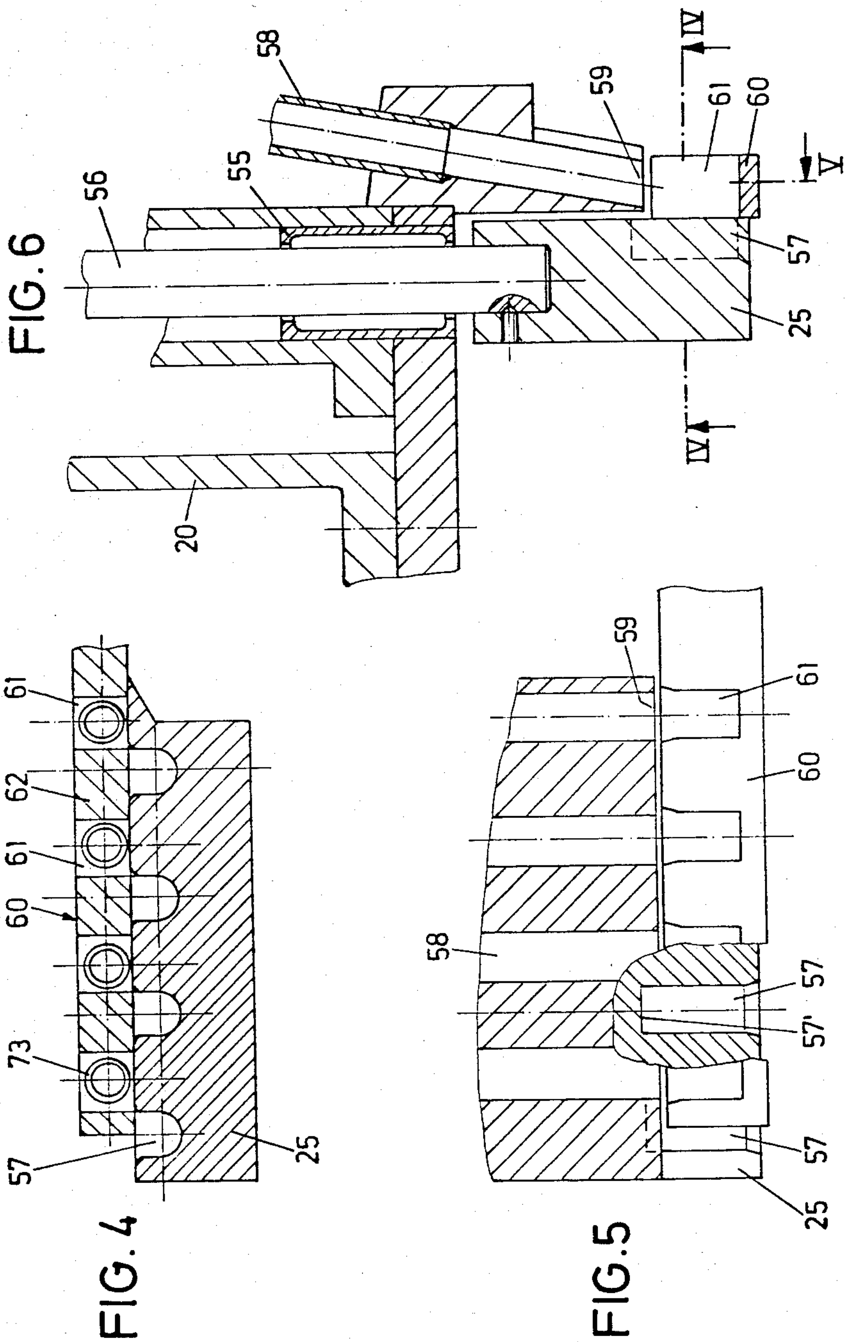
FIG. 4 is a partial section taken through the base body and the rack part of the feeder device.
FIG. 5 is a top view of the assembly shown in FIG. 4.
FIG. 6 is a section taken at right angles to the transporting device, and corresponds to the assembly shown in FIGS. 4 and 5.

As seen particularly well in FIGS. 3 and 6, a number of feeder lines 58 equal to the number of recesses 57 discharge from above the base body. The outlet openings 59 of the feeder lines 58 are disposed such that each is disposed in the vicinity of the space between the feeder recesses 57.

Above the base body 25 and forwardly of the openings 59, a rack element 60 is provided, supported on the base body 25 such that it can be slidingly reciprocated in the conveyance direction 4. The rack element 60 includes recesses 61 corresponding to the recesses 57 on the base body 25; in cross section, the recesses 61 are rectangular, and they are open toward the base body 25 (i.e. downwardly open) and closed toward the conveyor belt 1 (i.e. forwardly closed). Prongs 62 are formed between, and by means of, the recesses 61. In a first position of the rack element 60, prongs 62 are located in front of the outlet openings 59 of the feeder lines 58, thus blocking these lines. In this position, the recesses 61 coincide with the feeder recesses 57 of the base body. In a second position of the rack element 60, recesses 61 are located in front of the outlet openings 59 of the feeder lines 58. This position is shown in FIGS. 4, 5 and 6.

The actuation of the rack element 60 is effected via cam drives 63–65, which are schematically shown in FIG. 2. In FIG. 1, the cam drive 65 for the feeder device 18 and the transmission linkage 66 are shown in greater detail. The corresponding elements are provided in identical form for the feeder device 17. The cam drive 65 is scanned or followed by a roller 67, which is supported at the end of a linkage element 68. The middle of the linkage element 68 is supported on a stationary joint 69, which is connected to the frame 15. The other end of the linkage element 68 acts via crank (now shown in detail) supported on the work plate 20 such that it is pivotable about an axis perpendicular to the work plate 20, and the other arm of the crank is connected in turn with the guide rod 70 of the rack element 60. The guide rod 70 is supported in guide sleeves (not shown) in such a manner that it is movable back and forth in the conveyance direction 4 together with the rack element 60. The roller 67 is made to contact the cam drive 65 by means of a spring mechanism (not shown in detail). However, the cam drive 65 may also be embodied as a cam cylinder, which is scanned or followed on both sides, so that a compulsory guidance is attained.

The mode of operation of the apparatus according to the invention, and thus the method according to the invention as well, will now be described:

The drive wheels 71 seated on the main drive shaft 6 are driven thereby, and thus drive the entire drive mechanism derived therefrom. Via a supply and feeder device 72, pencils 14 are placed onto the conveyor belt 1 individually, one after another, and thereafter drop into the recesses 13 so that they are moved in the conveyance direction 4. Just as a set of four pencils 14 (to distinguish the sets from one another visually in FIG. 1, they are shown alternatively in dashed and solid lines) reaches the area immediately before the tapering device 16, the tapering device is driven in such a way that for a certain, predetermined distance along the conveyance route it travels alongside the set of pencils at the same speed. The base body 24 is moved toward the pencils 14 and effects a conical tapering of the ends of the pencils adjacent thereto via the recesses 53. The base body 24 of the tapering device 16 is then moved back again, during the course of which the pencils 14 are held in their position by the stripping-off device 54. The tapering device 16 then returns, at high speed, to its starting position.

At the onset of a new work cycle, the set of pencils reaches the areas immediately before the feeder device 17 for the sheaths, which now likewise travels along parallel to the set of pencils. During this process, one sheath is located in each recess 57 of the base body 25, and as a result of simultaneous movement of the base body 25 to the conveyance direction 4 toward conveyor 1, the sheaths are moved toward the pencils and pushed onto them. Because of the conical tapering of the pencils 14, a self-centering effect is attained, as well as a simultaneous clamping seat of the sheaths on the pencils. The pressing of the sheaths onto the pencils is facilitated by the abutment of the rear side of the sheaths against the rear wall 58 of their respective recesses 57, and the remote end of the pencils resting on the strip 8 of the stop device 7. After the sheaths have been put into place, the base body 25 moves back away from the pencils 14 and is returned back to its starting position by the backward movement of the work plate 20 parallel to the conveyance direction 4. At the beginning of this return movement, the rack element 60 is deflected out of the position shown in FIGS. 4, 5 and 6, so that the sheaths can drop into the now-empty recesses 57 of the base body 25. The rack element then returns back to its starting, recess covering position, and the outlet openings 59 of the feeder lines 58, which are connected with a supply magazine are then uncovered so that new sheaths can be supplied to the recesses 61 of the rack element 60. This situation is illustrated in FIG. 4 for cylindrical bodies 73 which may be either erasers or sheaths.

As a result of the operation of the apparatus, as described above, simultaneous emplacement of a plurality of sheaths (in this case, four) is advantageously attained; time for the return travel of the feeder device, ordinarily lost, is thereby saved so that a work step which by itself is discontinuous can be incorporated into a continuous process. Thus by controlling movements of the rack element, time required for the return movements of the feeder device 17 can be utilized for refilling purposes.

As the pencils 14 continue to travel in the conveyance direction 4, they reach the vicinity of the feeder device 18 for the erasers. The insertion of the erasers into the sheaths is effected in a completely analogous manner to the placement of the sheaths on the pencils. The sheaths merely need to be dimensioned such that a secure clamping seat is attained as a result of the axial pressure exerted.

After the pencils have traveled through the work stations, they are removed from conveyor belt 1 by means of a removing device 74, such as that described in detail in German Patent Application No. P 31 47 863.8.

Figure 7:
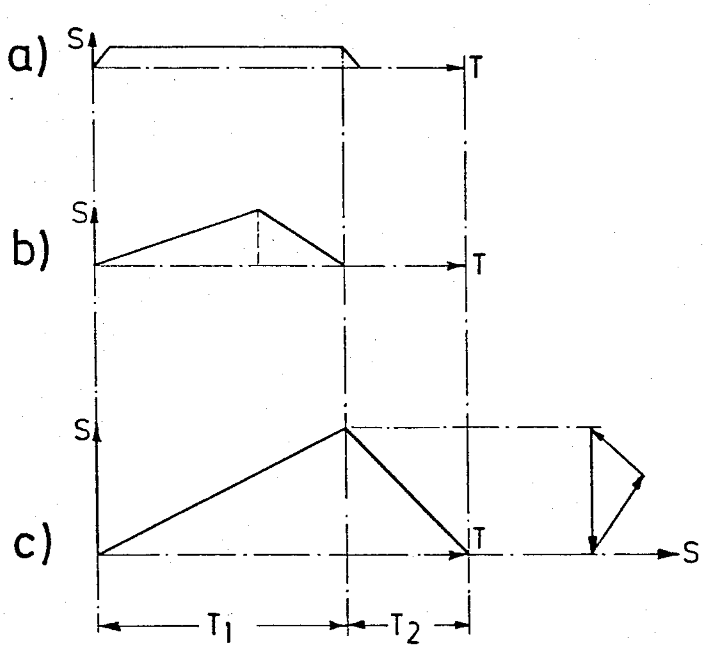
FIG. 7 is a diagram showing the routes traveled by the individual parts during one operating cycle.

In order to illustrate in detail the course of movement of the individual elements, the routes traveled are plotted in FIG. 7 in accordance with the time required for completing each complete work cycle. Each work cycle can be divided into two phases, $T_1$ and $T_2$, which correspond to the periods required for the forward, and the backward, movement, respectively, of the work plate 20.

FIG. 7(*a*) shows how the rack element 60 of the feeder devices 17 and 18 is brought, at the end of the forward-travel phase $T_1$, into the position where the outlet openings 59 of the feeder lines 58 are blocked by the prongs 62 of the rack element 60 and sheaths or erasers are inserted into the recesses 57. At the onset of the new work phase, the rack element 60 is then displaced such that the outlet openings 59 are uncovered, so that a new set of sheaths can be supplied. The deflection of the rack element 60 then amounts to approximately half the distance A, or A/2. The movement of the rack element 60 is effected parallel to the conveyance direction 4.

In FIG. 7(*b*), the travel of the base body 25 (or 26) of the feeder device 17 (or 18) is shown. It can be seen that the process of placing the sheaths on the pencils (or the erasers into the sheaths) takes place during the forward-movement phase, wherein the base body 25 or 26 moves to and fro at right angles to the conveyance direction 4, toward and away from the pencils 14 being transported along the conveyor belt 1. The deflection path of the feeder device 17 for the sheaths has to be somewhat greater in dimension in quantitative terms than that of the feeder device 18 for the erasers, because the sheaths have to be pushed onto the pencils to greater depth than the erasers have to be pushed in being inserted into the sheaths.

FIG. 7(*c*) shows the travel of the work plate 20 parallel to the conveyance direction 4 and beside it the travel of the base bodies 25, 26. The axis for the travel of the work plate 20 in the graph serves as the axis for the time of the movement of the base bodies. The drawing shows that, as described above, the work plate moves in the conveyance direction 4 during a first phase $T_1$ and is then moved back counter to the conveyance direction 4, during a second phase $T_2$, which is shorter than $T_1$. During the forward movement, the base body 25 or 26 performs the movement for placement or insertion of the sheaths or erasers, while during the return movement it is relocated in its starting position.

What is claimed is:

1. In an apparatus for attaching parts, such as erasers and/or sheaths for holding the erasers, on the ends of elongated writing instruments, the improvement comprising:
   - a linear conveyor device for carrying sets of writing instruments through said apparatus, said conveyor device defining means for supporting said writing instruments normal to the direction of movement of said conveyor device and parallel to, and equidistantly spaced apart from, one another:
   - means for feeding said supplied parts toward said conveyor device, said supplying means being coupled to said feeding means at said location, each said feeding means including means for pushing said parts onto said writing instruments and menas for moving said feeding means parallel to, adjacent and at the same rate as said conveyor device:
   - whereby as said conveyor device carries said writing instruments to said feeding means, and when said writing instruments register with said supplied parts, said feeding means first moves from said location in the same direction as said conveyor device while said parts as pushed onto said writing instruments, and then moves in the reciprocal direction back to said location whereupon said supplying means again supplied parts to said feeding means.

2. The improvement of claim 1, and further comprising a tapering device disposed upstream of said supplying means, said tapering device having an approximately conical shaping recess, and a cam drive movable in a coordinated manner with the drive of the conveyor device for moving said tapering device at right angles to the direction of movement of said conveyor device, said tapering device being movable in a manner corresponding to the manner of movement of said feeding means.

3. The improvement of claim 2, wherein the tapering recess has a trumpet-like configuration.

4. The improvement of claim 2 and further including a stripping-off device associated with the tapering device.

5. The improvement of claim 4, wherein said tapering device, and said feeding means are disposed one after the other along the extent of said conveyor device.

6. The improvement of claim 1, and further comprising a tapering device for tapering adjacent ends of said writing instruments, said feeding means comprising a first feeder for feeding sheaths and a second feeder for feeding erasers, said tapering device, said first feeder and said second feeder being disposed one after the other along the extent of said conveyor.

7. The improvement of the claim 6, and further including a gluing station disposed between the feeder for the sheaths and the feeder for the erasers.

8. The improvement of claim 7, and further including a stop device disposed on the side of the conveyor device opposite the tapering device and said feeder.

9. The improvement of claim 8, wherein said stop device includes a strip disposed in a plane perpendicular to that of the conveyor device and which is moved toward and away therefrom in synchronism with said tapering device or said feeders.

10. The improvement of claim 1, wherein said conveyor device comprises a conveyor belt.

11. The improvement of claim 9, wherein said conveyor belt comprises a steel band.

12. The improvement of the claim 1 wherein said feeding means includes pressure-exerting means having a plurality of feeder recesses disposed parallel to and beside one another, said feeder recesses being closed at the back and having the form of cylindrical segments.

13. The improvement of claim 1, wherein said feeding means includes body means, and recesses located in said body means, said body means being guidably movable back and forth in the manner of a sled at right angles to the extent of the conveyor device, and being receprocably driven via a cam drive coupled to the drive of the conveyor device.

14. The improvement of claim 13, wherein in one terminal position of the body means feeder lines leading from said supplying means discharge above the rear wall of the feeder recesses, with each line being offset from each recess.

15. The improvement of claim 13, wherein said feeding means includes a rack element disposed above said body means, said supplying means including outlet openings, said rack element being disposed forwardly of said outlet opening, said rack element including recesses corresponding to said body means recesses, said rack element being displaceable parallel to the extent of said conveyor device and relative to said body means recesses in such a manner that said recesses of the rack element, during the movement of the body means in the direction of extent of said conveyor device, are located forwardly of the outlet openings of the supplying means and are located above the recesses of the body means during the return movement.

16. The improvement of claim 15, wherein said rack element is driven, relative to said body means, via a cam drive coupled to the drive of the conveyor device.

17. The improvement of claim 13, wherein said cam drive includes a cam cylinder scanned on both sides thereof.

18. The improvement of claim 2, wherein said cam drive includes a cam cylinder and means for following said cylinder on both sides thereof.

19. The improvement of claim 1, and further including a stop device disposed on the side of said conveyor device opposite said feeding means.

* * * * *